US007024768B2

(12) United States Patent
Giri et al.

(10) Patent No.: US 7,024,768 B2
(45) Date of Patent: Apr. 11, 2006

(54) FLUID EJECTION DEVICE HAVING A LAYER WITH A DISCONTINUITY

(75) Inventors: Manish Giri, Corvallis, OR (US); Philip H. Harding, Albany, OR (US); Mark Sanders Taylor, Monmouth, OR (US); Jeffery S. Hess, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 313 days.

(21) Appl. No.: 10/327,289

(22) Filed: Dec. 21, 2002

(65) Prior Publication Data

US 2003/0202052 A1 Oct. 30, 2003

Related U.S. Application Data

(62) Division of application No. 10/135,162, filed on Apr. 30, 2002, now Pat. No. 6,527,368.

(51) Int. Cl.
*B21D 53/76* (2006.01)
*B41J 2/045* (2006.01)
*G01D 15/00* (2006.01)
*G11B 5/127* (2006.01)

(52) U.S. Cl. ......................... 29/890.1; 29/830; 29/831; 29/846; 29/870; 347/71; 347/63; 347/44; 216/27

(58) Field of Classification Search ............... 29/890.1, 29/830, 831, 846, 870; 347/71, 44, 63, 65, 347/67; 216/27
See application file for complete search history.

(56) References Cited

U.S. PATENT DOCUMENTS 4,550,326 A 10/1985 Allen et al.
4,680,771 A 7/1987 Koseki
4,994,825 A 2/1991 Saito et al.
5,069,978 A 12/1991 Mizuhara
5,167,776 A 12/1992 Bhaskar et al.
5,194,877 A 3/1993 Lam et al.
5,230,459 A 7/1993 Mueller et al.
5,255,016 A 10/1993 Usui et al.
5,443,713 A 8/1995 Hindman
5,506,608 A 4/1996 Marler et al.
5,560,837 A 10/1996 Trueba
5,847,725 A 12/1998 Cleland et al.
5,988,786 A 11/1999 Waller et al.
6,074,036 A 6/2000 Nishioka et al.
6,106,098 A 8/2000 Nakamura et al.
6,162,589 A * 12/2000 Chen et al. ................. 430/320
6,179,412 B1 1/2001 Ishinaga et al.
6,250,738 B1 * 6/2001 Waller et al. ................. 347/42
6,273,544 B1 * 8/2001 Silverbrook ................. 347/20
6,520,617 B1 2/2003 Blair

* cited by examiner

*Primary Examiner*—A. Dexter Tugbang
*Assistant Examiner*—Tai Van Nguyen

(57) ABSTRACT

In one embodiment, a fluid ejection device comprises a substrate having a first surface, and a fluid slot in the first surface. The device further comprises a fluid ejector formed over the first surface of the substrate, and a chamber layer formed over the first surface of the substrate. The chamber layer defines a chamber about the fluid ejector, wherein fluid flows from the fluid slot towards the to be ejected therefrom. The chamber layer has a discontinuity, wherein the discontinuity is positioned over the fluid slot.

7 Claims, 6 Drawing Sheets

FLUID EJECTION DEVICE HAVING A LAYER WITH A DISCONTINUITY

CROSS REFERENCE TO RELATED APPLICATION(S)

This is a divisional of copending application Ser. No. 10/135,162 filed on Apr. 30, 2002 which is hereby incorporated by reference herein.

FIELD OF THE INVENTION

The present invention relates to fluid ejection devices, and more particularly to a layer with a discontinuity over a fluid slot of a fluid ejection device.

BACKGROUND OF THE INVENTION

Various inkjet printing arrangements are known in the art and include both thermally actuated printheads and mechanically actuated printheads. Thermal actuated printheads tend to use resistive elements or the like to achieve ink expulsion, while mechanically actuated printheads tend to use piezoelectric transducers or the like.

A representative thermal inkjet printhead has a plurality of thin film resistors provided on a semiconductor substrate. A nozzle layer is deposited over thin film layers on the substrate. The nozzle chamber layer defines firing chambers about each of the resistors, an orifice corresponding to each resistor, and an entrance to each firing chamber. Often, ink is provided through a slot in the substrate and flows through an ink channel defined by the nozzle layer to the firing chamber. Actuation of a heater resistor by a "fire signal" causes ink in the corresponding firing chamber to be heated and expelled through the corresponding orifice.

Continued adhesion between the nozzle layer and the thin film layers is desired. With printhead substrate dies, especially those that are larger-sized or that have high aspect ratios, unwanted warpage, and thus nozzle layer delamination, may occur due to mechanical or thermal stresses. For example, often, the nozzle layer has a different coefficient of thermal expansion than that of the semiconductor substrate. The thermal stresses may lead to delamination of the nozzle layer, or other thin film layers, ultimately leading to ink leakage and/or electrical shorts. In an additional example, when the dies on the assembled wafer are separated, delamination may occur. In additional and/or alternative examples, the nozzle layer can undergo stresses due to nozzle layer shrinkage after curing of the layer, structural adhesive shrinkage during assembly of the nozzle layer, handling of the device, and thermal cycling of the fluid ejection device.

SUMMARY

In one embodiment, a fluid ejection device comprises a substrate having a first surface, and a fluid slot in the first surface. The device further comprises a fluid ejector formed over the first surface of the substrate and a chamber layer formed over the first surface of the substrate. The chamber layer defines a chamber about the fluid ejector, wherein fluid flows from the fluid slot towards the chamber to be ejected therefrom. The chamber layer has a discontinuity, wherein the discontinuity is positioned over the fluid slot.

DETAILED DESCRIPTION

Figure 1:
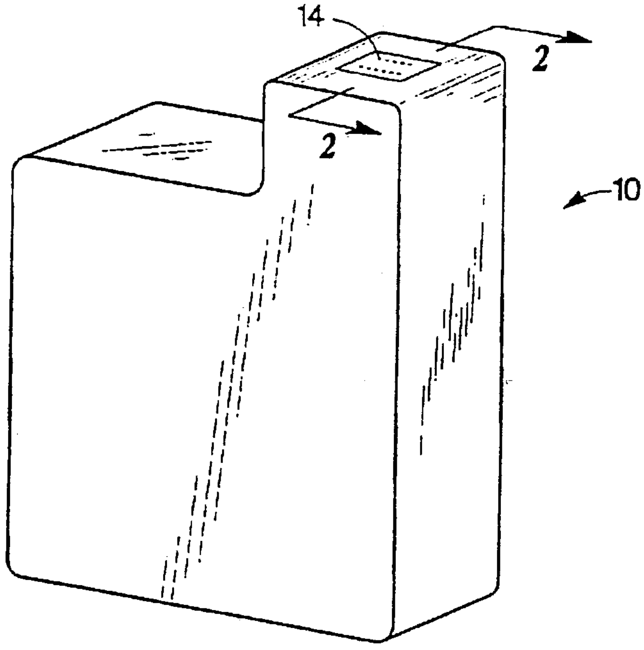
FIG. 1 illustrates a perspective view of an embodiment of a fluid ejection cartridge of the present invention.
Figure 2:
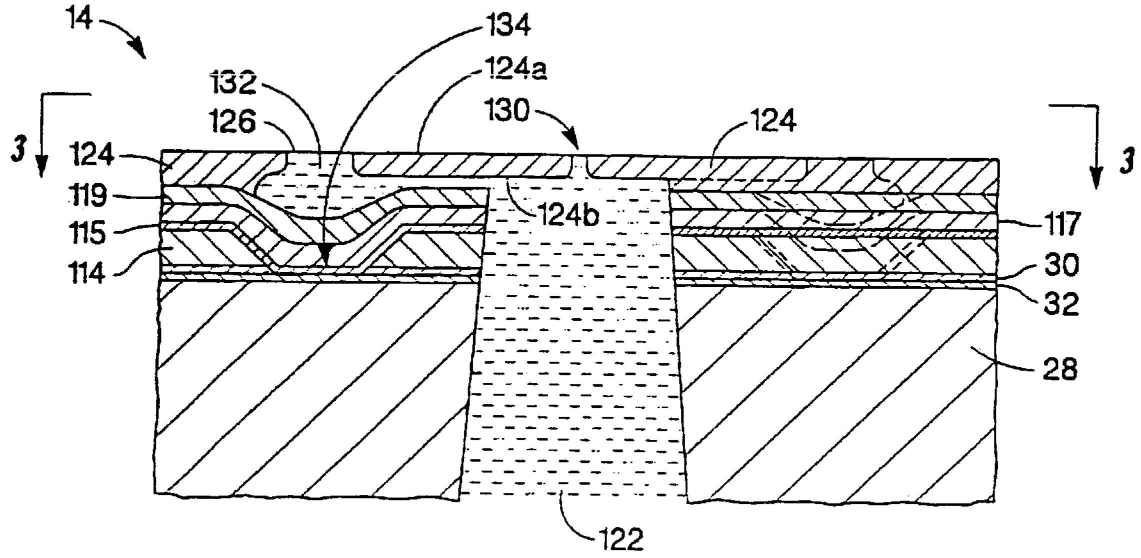
FIG. 2 illustrates a cross-sectional view of an embodiment of a fluid ejection device taken through section 2—2 of FIG. 1.

FIG. 1 is a perspective view of an embodiment of a cartridge 10 having a fluid drop generator or fluid ejection device 14, such as a printhead. The embodiment of FIG. 2 illustrates a cross-sectional view of the printhead 14 of FIG. 1 where a slot 122 is formed through a substrate 28. Some of the embodiments used in forming the slot through a slot region (or slot area) in the substrate include abrasive sand blasting, wet etching, dry etching, DRIE, and UV laser machining.

In one embodiment, the substrate 28 is silicon. In various embodiments, the substrate is one of the following: single crystalline silicon, polycrystalline silicon, gallium arsenide, glass, silica, ceramics, or a semiconducting material. The various materials listed as possible substrate materials are not necessarily interchangeable and are selected depending upon the application for which they are to be used.

In the embodiment of FIG. 2, a thin film stack (such as an active layer, an electrically conductive layer, or a layer with micro-electronics) is formed or deposited on a front or first side (or surface) of the substrate 102. In one embodiment, a capping layer 32 is formed over a first surface of the substrate. Capping layer 32 may be formed of a variety of different materials such as field oxide, silicon dioxide, aluminum oxide, silicon carbide, silicon nitride, and glass (PSG). In this embodiment, a layer 30 is deposited or grown over the capping layer 32. In a particular embodiment, the layer 30 is one of titanium nitride, titanium tungsten, titanium, a titanium alloy, a metal nitride, tantalum aluminum, and aluminum silicone.

In this embodiment, a conductive layer 114 is formed by depositing conductive material over the layer 30. The conductive material is formed of at least one of a variety of different materials including aluminum, aluminum with about ½% copper, copper, gold, and aluminum with ½% silicon, and may be deposited by any method, such as sputtering and evaporation. The conductive layer 114 is patterned and etched to form conductive traces. After forming the conductor traces, a resistive material 115 is deposited over the etched conductive material 114. The resistive material is etched to form an ejection element 134, such as a resistor, a heating element, or a bubble generator. A variety of suitable resistive materials are known to those of skill in the art including tantalum aluminum, nickel chromium, and titanium nitride, which may optionally be doped with suitable impurities such as oxygen, nitrogen, and carbon, to adjust the resistivity of the material.

As shown in the embodiment of FIG. 2, an insulating passivation layer 117 is formed over the resistive material.

Passivation layer 117 may be formed of any suitable material such as silicon dioxide, aluminum oxide, silicon carbide, silicon nitride, and glass. In this embodiment, a cavitation layer 119 is added over the passivation layer 117. In a particular embodiment, the cavitation layer is tantalum.

In one embodiment, a top layer 124 is deposited over the cavitation layer 119. In one embodiment, the top layer 124 is a chamber layer comprised of a fast cross-linking polymer such as photoimagable epoxy (such as SU8 developed by IBM), photoimagable polymer or photosensitive silicone dielectrics, such as SINR-3010 manufactured by ShinEtsu™. In another embodiment, the top layer 124 is made of a blend of organic polymers which is substantially inert to the corrosive action of ink. Polymers suitable for this purpose include products sold under the trademarks VACREL and RISTON by E. I. DuPont de Nemours and Co. of Wilmington, Del.

In a particular embodiment, the chamber layer 124 defines a firing chamber 132 where fluid is heated by the corresponding ejection element 134 and defines a nozzle orifice 126 through which the heated fluid is ejected. Fluid flows through the slot 122 and into the firing chamber 112 via channels formed in the chamber layer 124. Propagation of a current or a "fire signal" through the resistor causes fluid in the corresponding firing chamber to be heated and expelled through the corresponding nozzle 126. In another embodiment, an orifice layer having the orifices 126 is applied over the chamber layer 124.

An example of the physical arrangement of the chamber layer, and thin film substructure is illustrated at page 44 of the Hewlett-Packard Journal of February 1994. Further examples of ink jet printheads are set forth in commonly assigned U.S. Pat. No. 4,719,477, U.S. Pat. No. 5,317,346. and U.S. Pat. No. 6,162,589. Embodiments of the present invention include having any number and type of layers formed or deposited over the substrate, depending upon the application.

Figure 3:
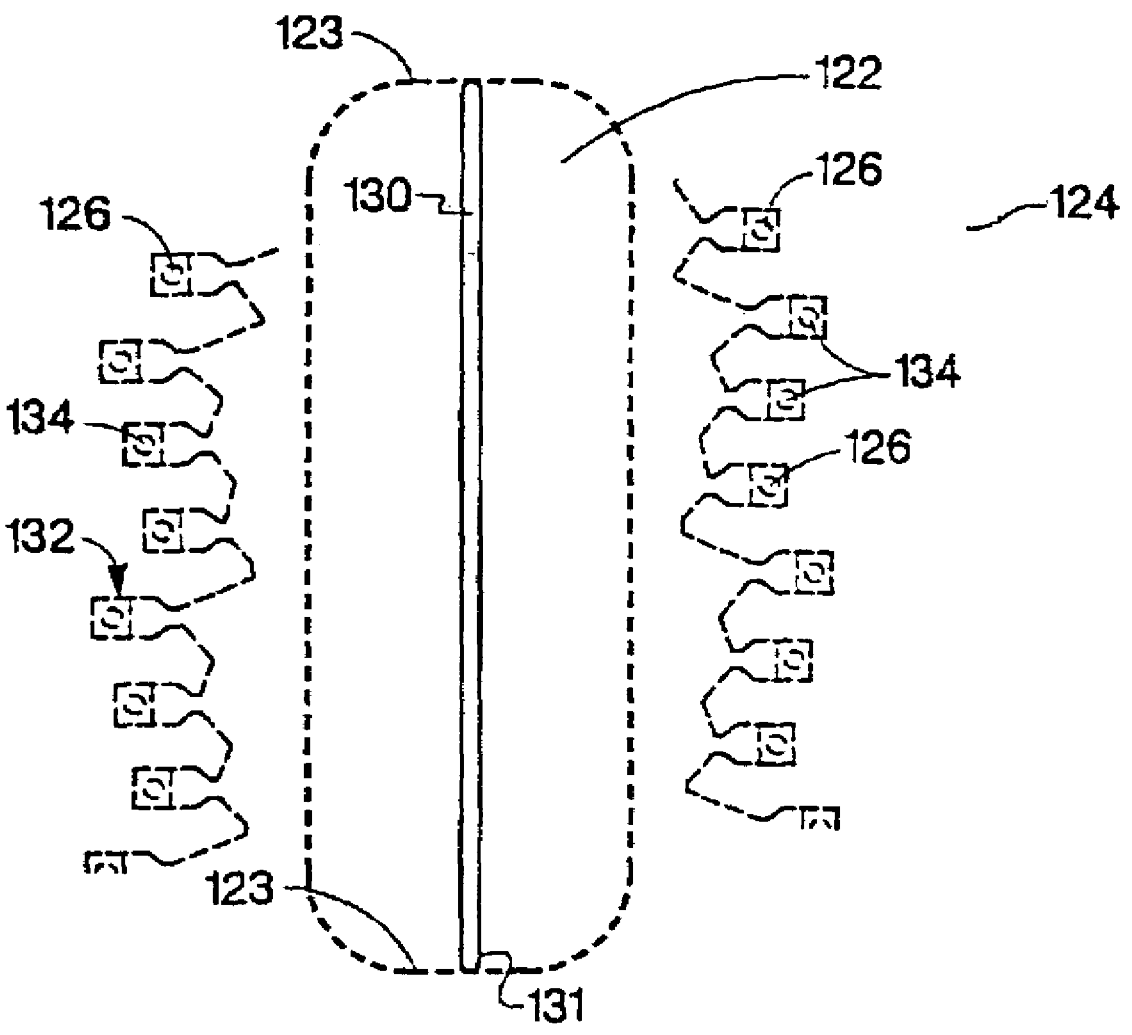
FIG. 3 illustrates a plan view of an embodiment of a fluid ejection device taken through section 3—3 of FIG. 2.

As shown more clearly in the printhead 14 of FIG. 3, the nozzle orifices 126 are arranged in rows located on both sides of the slot 122. In one embodiment, the nozzle orifices, and corresponding firing chambers are staggered from each other across the slot. In FIG. 2, a firing chamber in the printhead that is staggered across the slot from the firing chamber 132 is shown in dashed lines.

As shown in the embodiment of FIG. 2, a discontinuity 130 is in the layer 124, such as a gap, a stress relieving slot, or an aperture. In one embodiment, the discontinuity 130 provides a means for alleviating stress and strain in the layer 124. In a particular embodiment, a force in a z-direction (or vertical direction) on the substrate 28 and the layer 124 may move longitudinal sides of slot 122 vertically with respect to each other. Consequently, in this embodiment, the top layer 124 may move and may tend to peel or delaminate from the underneath layers. In this embodiment, the discontinuity 130 tends to enable the top layer to more easily move with the respective longitudinal sides of the slotted substrate.

In one embodiment, the discontinuity 130 is a gap that can have a width of up to about 16 microns. In another embodiment, the discontinuity has a width that is minimized. In yet another embodiment, the discontinuity has a width of about 0–2 microns, wherein longitudinal sides of the discontinuity 130 are touching at least in some areas along the gap (not shown in this embodiment). In other embodiments, the width is about 6, 8, 10, or 12 microns, depending upon the application.

In an additional embodiment, the discontinuity has a width such that fluid drool or back pressure from the discontinuity is minimized or mitigated. In another additional embodiment, the discontinuity has a width such that a fluid meniscus (capillary resistance) holds the fluid within the top layer, and keeps the fluid from drooling out of the top layer. In yet another embodiment, the dimensions are specific to the surface tension of the fluid and the surface properties of the polymer film used in the fluid ejection device. In this embodiment, the layer 124 has a first surface 124*a,* and a second opposite surface 124*b*. In this embodiment shown, the discontinuity 130 extends from the first surface to the second surface.

As shown in the embodiment of FIG. 3, ends 131 of discontinuity 130 are rounded similar to the rounded ends 123 of the slot 122. In this embodiment shown, a length of the discontinuity 130 is about the same as a length of the fluid slot. Ends 123 of the fluid slot are shown in FIG. 3. In this embodiment, a length of the longitudinal side of the slot is substantially the same as the distance from slot end to slot end 123. In another embodiment, the discontinuity 130 has a length such that the layer 124 substantially maintains adhesiveness to the thin film layers underneath, and fluid drool is minimized. In yet another embodiment, the discontinuity is as long as the trench such that the discontinuity is effective in mitigating mechanical stresses in the chamber layer. In alternative embodiments, the discontinuity 130 extends longer than the length of the slot 122 and shorter than the length of the slot, depending upon the application (embodiments not shown).

In this embodiment, the discontinuity 130 is located in between longitudinal sides of the slot 122. In a particular embodiment, the discontinuity 130 in the layer 124 is substantially centered over the slot.

Figure 4:
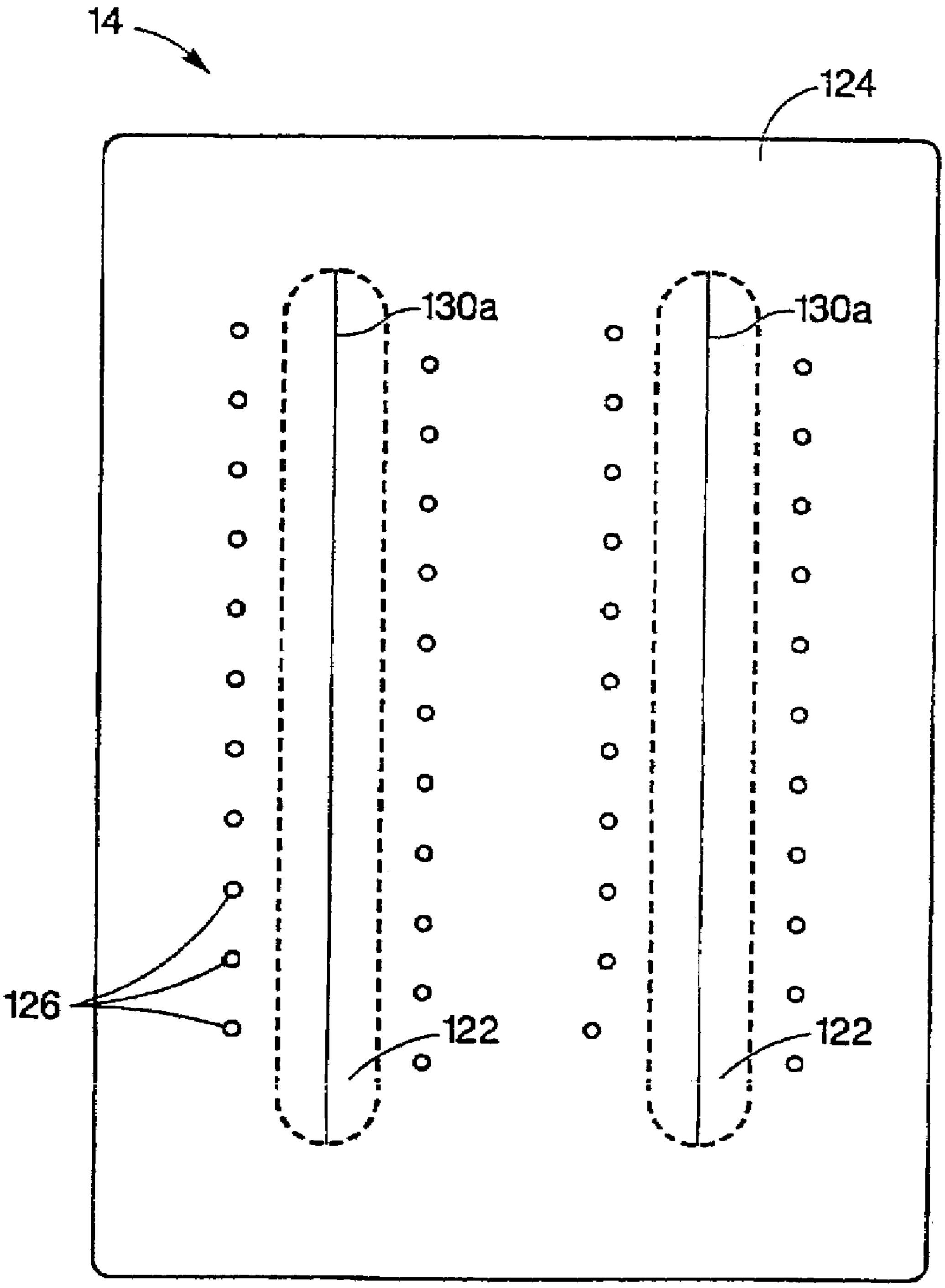
FIG. 4 illustrates a plan view of an alternative embodiment of a fluid ejection device.

As shown in the alternative embodiment of FIG. 4, there is a discontinuity or slit 130*a* in the layer 124. In a particular embodiment, the slit is a closed slit. In another embodiment, longitudinal sides of the slit are substantially in contact with each other along a length of the slit.

Figure 5:
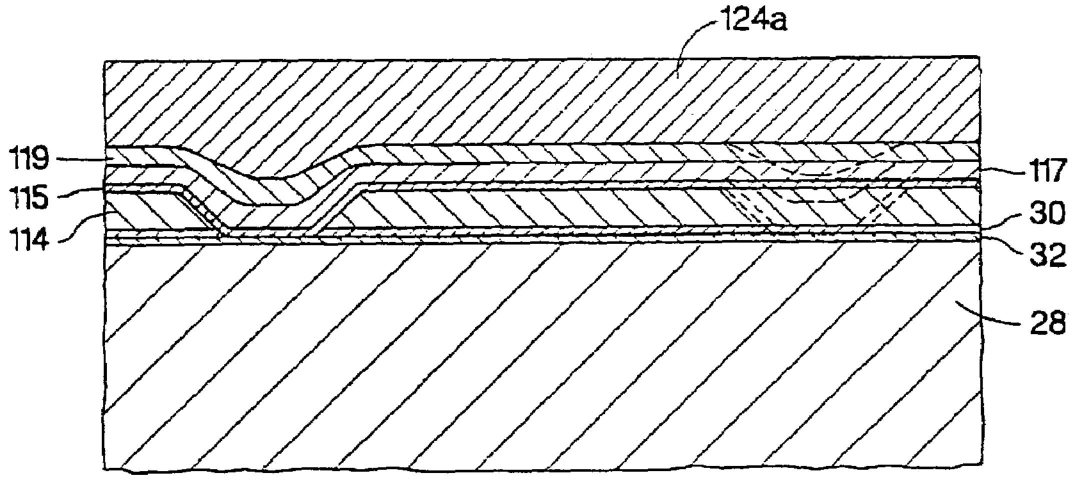
FIGS. 5–7 illustrate cross-sectional views showing a method of forming the fluid ejection device embodiment illustrated in FIG. 4.
Figure 6:
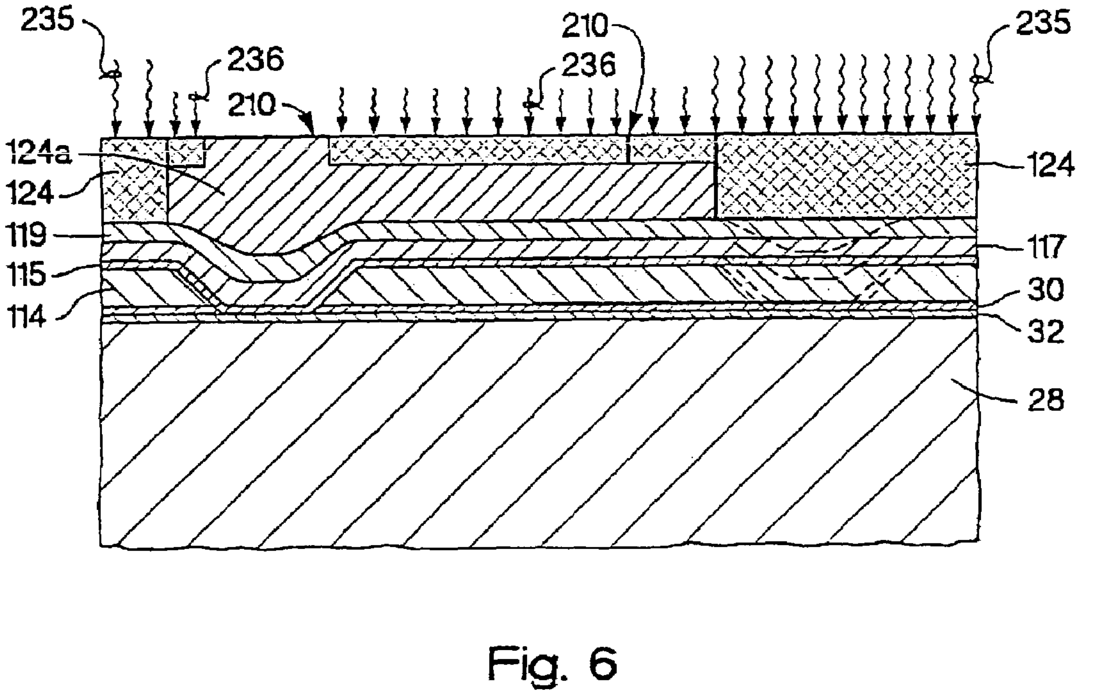
Figure 7:
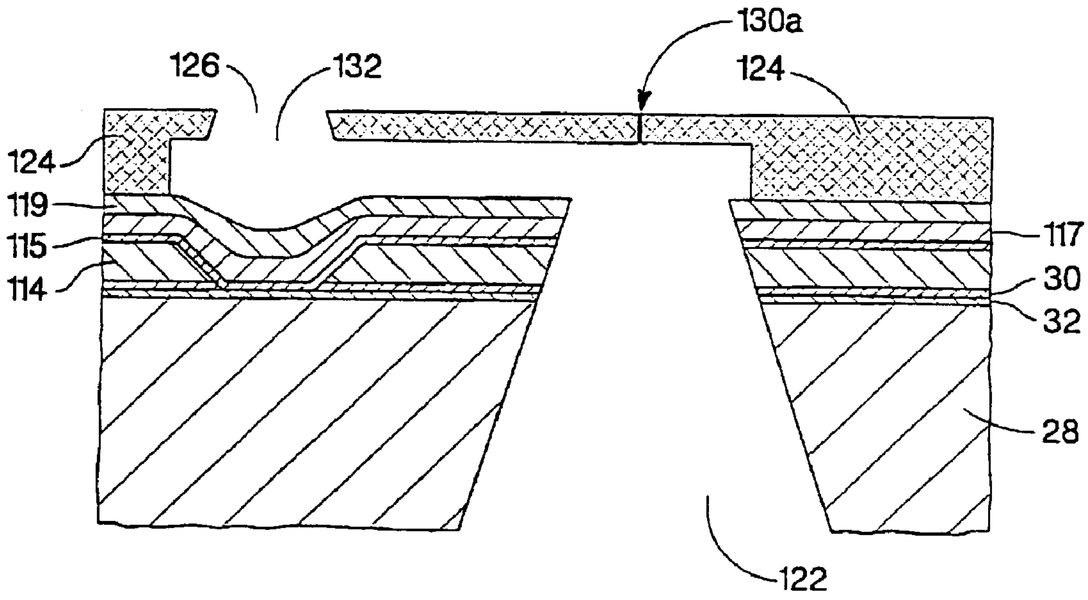

FIGS. 5–7 illustrate an embodiment of forming the fluid ejection device having the discontinuity 130 or the slit 130*a* in the layer 124, in accordance with the present invention. As shown in the embodiment of FIG. 5, a material 124*a* for forming the top layer 124 is formed or deposited over the thin film stack.

As shown in the embodiment of FIG. 6, the material 124*a* is masked with at least one mask 210 and then exposed to varying levels of radiation to define the chamber layer 124. The masks allow for controlling the entrance diameter to the firing chamber, the exit diameter of the orifice, the firing chamber volume based on the orifice layer height, as well as the volume of the discontinuity. For example, for the discontinuity 130 in the embodiment of FIG. 3, at least one of the mask shapes in a plan view is similar to the plan view shown in FIG. 3. In this embodiment, the lines forming the discontinuity 130, the slot 122, the chambers 132, and the nozzles 126 in FIG. 3 can also be interpreted as at least one of the masks used in defining the chamber layer 124. Similarly, for the discontinuity 130*a* in the embodiment of FIG. 4, at least one of the mask shapes in a plan view is similar to the plan view shown in FIG. 4. In particular, the lines forming the slit 130*a,* the slot 122, and the nozzles 126 in FIG. 4 can also be interpreted as at least one of the masks used in defining the chamber layer 124. Accordingly, the at least one mask 210 may have different widths for forming the discontinuity 130/130*a* depending upon the width of the discontinuity desired. In one embodiment, the slit is formed using the negative photoresist qualities of the chamber layer material.

In this embodiment shown in FIG. 6, the material 124*a* is exposed to differing intensity levels of radiation 235, 236 along its outer surface, depending upon the shape of the chamber layer 124 desired. In one embodiment, electromagnetic radiation is used to cross-link a photoimagable material layer using the at least one mask 210. A more detailed example of exposing a material to differing intensity levels of radiation to form a desired layer shape is set forth in commonly assigned U.S. Pat. No. 6,162,589.

In one embodiment, after the material 124*a* is exposed to the irradation, there is about a 6% shrinkage by volume in the layer 124 compared with the original mask. In this embodiment, the discontinuity grows wider than the mask design.

As shown in the embodiment of FIG. 7, the slit 130*a* is formed in the layer 124, and the material 124*a* for forming the layer 124 is removed through a developing method. After removing this material, the fluid path through the slot, and chamber layer chamber and orifice is formed. In another embodiment, the discontinuity 130 is formed in a similar manner, however, the at least one mask is/are slightly different, accordingly.

Figure 8:
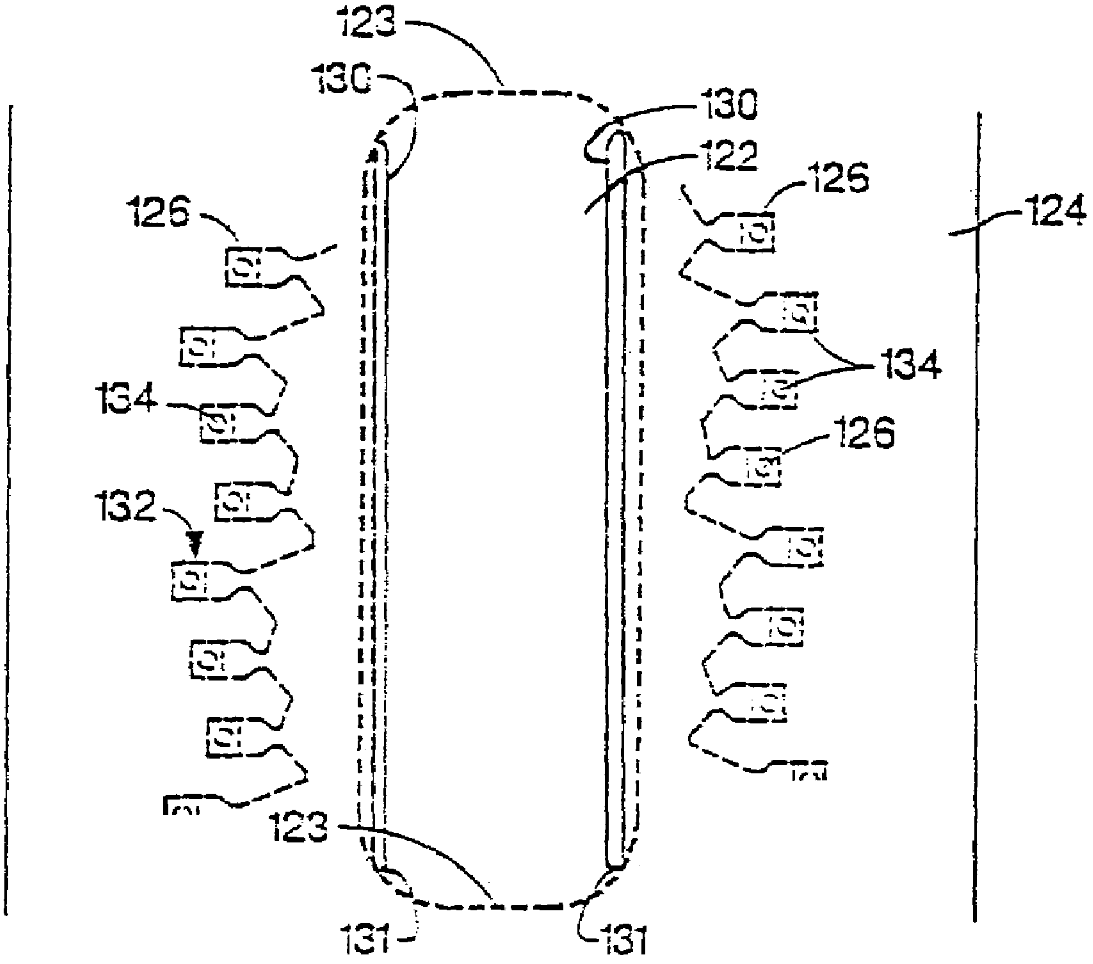
FIG. 8 illustrates a plan view of an additional embodiment of a fluid ejection device.

An additional embodiment is shown in FIG. 8, wherein there are multiple discontinuities 130, such as an expansion grate, in the chamber layer 124. In this embodiment, the multiple discontinuities are substantially parallel to each other along the length of the slot. In the embodiment shown, there are two discontinuities near the trench shelf However, the location and number of discontinuities are not so limited. For example, there may be three or more discontinuities spread out over the suspended portion of the chamber layer. In further embodiments, the discontinuities of FIG. 8 may be similar to the discontinuities 130*a,* as discussed herein. It is therefore to be understood that this invention may be practiced otherwise than as specifically described. For example, the present invention is not limited to thermally actuated printheads, but may also include, for example, piezoelectric activated printheads, and other mechanically actuated printheads, as well as other applications having a thin suspended polymer film. Methods of alleviating stress in a thin suspended polymer film may also be applied to micro-electro-mechanical systems (MEMS devices). Thus the present embodiments of the invention should be considered in all respects as illustrative and not restrictive, the scope of the invention to be indicated by the appended claims rather than the foregoing description. Where the claims recite "a" or "a first" element of the equivalent thereof, such claims should be understood to include incorporation of one or more such elements, neither requiring nor excluding two or more such elements.

What is claimed is:

1. A fluid ejection device formed by a method, the method comprising:

forming a fluid slot through a substrate;

forming an ejection element upon the substrate along a side of the fluid slot;

forming a chamber layer over the substrate and the ejection element;

masking the chamber layer; and exposing the chamber layer to define a firing chamber that surrounds the ejection element, to define an orifice corresponding to the ejection element, and to define a discontinuity therein over the fluid slot wherein the discontinuity has two longitudinal sides that correspond to a length of longitudinal sides of the fluid slot, wherein at least in some areas along the discontinuity the two longitudinal sides of the discontinuity are in contact with each other.

2. A fluid ejection device formed by a method, the method comprising:

forming a slot through a substrate;

forming an ejection element upon the substrate along a side of the slot;

forming a chamber layer over the substrate and the ejection element;

masking the chamber layer; and exposing the chamber layer to define a firing chamber that surrounds the ejection element, an orifice corresponding to the ejection element, and a discontinuity therein over the slot wherein the discontinuity is located in between longitudinal sides of the slot.

3. The fluid ejection device of claim 2 further including:

defining the discontinuity as one or more stress relieving slots through the chamber layer of the fluid ejection device;

where the one or more stress relieving slots are formed over the slot in the substrate; and where the one or more stress relieving slots are formed such that capillary and meniscus properties of a fluid used by the fluid ejection device mitigate fluid drool trough the stress relieving slots.

4. The fluid ejection device of claim 2, the method further including positioning one or more layers between the substrate and the chamber layer.

5. The fluid ejection device of claim 2, the method further including forming multiple discontinuities in the chamber layer that form an expansion grate in the chamber layer.

6. The fluid ejection device of claim 2 where the discontinuity is formed having a width that keeps fluid from the fluid slot from drooling out of the chamber layer through the discontinuity.

7. The fluid ejection device of claim 2 where the chamber layer is formed as a top layer over the substrate and the discontinuity is configured to allow the chamber layer to move to prevent delamination of the chamber layer.

* * * * *

UNITED STATES PATENT AND TRADEMARK OFFICE

CERTIFICATE OF CORRECTION

PATENT NO. : 7,024,768 B2
APPLICATION NO. : 10/327289
DATED : April 11, 2006
INVENTOR(S) : Manish Giri et al.

It is certified that error appears in the above-identified patent and that said Letters Patent is hereby corrected as shown below:

On the Title Pg, Item (56), under "U.S. Patent Documents", line 15,
delete "6,106,098 A 8/2000 Nakamura et al." and
insert -- 6,106,096 8/2000 Komplin et al. --, therefor.

On the Title Pg, Item (57), under "Abstract", line 7, after "towards the" insert -- chamber --.

In column 3, line 23, delete "112" and insert -- 132 --, therefor.

In column 6, line 41, in Claim 3, delete "trough" and insert -- through --, therefor.

Signed and Sealed this

Seventh Day of April, 2009

JOHN DOLL
*Acting Director of the United States Patent and Trademark Office*